United States Patent [19]

Kerschbaumer et al.

[11] Patent Number: 4,657,952

[45] Date of Patent: Apr. 14, 1987

[54] THERMOPLASTIC GLASS FIBER-REINFORCED POLYAMIDE MOLDING MATERIAL

[75] Inventors: Franz Kerschbaumer, Steinhausen; Klaus Schmidt, Chur, both of Switzerland

[73] Assignee: Ems Inventa AG, Switzerland

[21] Appl. No.: 833,062

[22] Filed: Feb. 24, 1986

[30] Foreign Application Priority Data

Feb. 22, 1985 [CH] Switzerland ............................. 818/85

[51] Int. Cl.⁴ ............................. C08J 3/20; C08K 3/40
[52] U.S. Cl. ...................................... 523/351; 524/514
[58] Field of Search ........................... 523/351; 524/514

[56] References Cited

U.S. PATENT DOCUMENTS

| | | | |
|---|---|---|---|
| 3,936,413 | 2/1976 | Wurmb et al. | 524/420 |
| 4,167,505 | 9/1979 | Dunkelberger | 524/514 |
| 4,268,432 | 5/1981 | Maslen et al. | 523/351 |
| 4,338,406 | 7/1982 | Sanderson et al. | 525/183 |
| 4,363,894 | 12/1982 | Locatelli | 524/514 |
| 4,381,366 | 4/1983 | Sanderson et al. | 525/66 |

*Primary Examiner*—Lewis T. Jacobs
*Attorney, Agent, or Firm*—Jordan B. Bierman

[57] ABSTRACT

Thermoplastic polyamide molding materials containing impact resistance-providing additives, which are reinforced with glass fibers and are colored with dyes and pigments, comprise a mixture of components A and B.

Component A comprises glass fiber-containing polyamide and component B comprises polyamide with impact resistance-providing additives and can also contain dyes, pigments, heat and light-stabilizers, as well as processing agents.

Due to the separate addition of the glass fibers and the impact resistance-providing additives, pigments, etc. to the polyamide, the conventional reduction in mechanical properties, such as impact resistance and notch toughness, on the addition of all the other components to the polyamide, is surprisingly prevented.

20 Claims, No Drawings

THERMOPLASTIC GLASS FIBER-REINFORCED POLYAMIDE MOLDING MATERIAL

FIELD OF THE INVENTION

The present invention relates to thermoplastic glass fiber-reinforced polyamide-based molding materials with improved impact resistance and notch toughness.

BACKGROUND OF THE INVENTION

Polyamides (PA) have found broad application for technical uses. As the stiffness of the PA makes them inappropriate for many uses, they are often reinforced with glass fibers. Such glass fiber-reinforced polyamides are found widely in the upper housings of electrical hand tools such as percussion drills. The disadvantage of such glass fiber-reinforced polyamides is that they have reduced impact resistance in comparison to unreinforced PA types.

Due to this insufficient impact resistance, glass fiber-reinforced PA often fails to meet standard test requirements for electrical tools. Attempts have therefore been made to improve the impact resistance of glass fiber-reinforced polyamides by the addition of modifiers.

In known processes (EP-A No. 0021303 and EP-A No. 0027198), glass fibers, impact resistance modifiers and, optionally, dyes, are extruded with the PA in the same channel. In this way, impact resistance modifiers, dyes or pigments can also be extruded with the PA in a first extrusion channel and then the glass fibers can be worked into this impact resistance-modified PA in a second extrusion channel.

If dyes or pigments, e.g. $TiO_2$, which have undesirable effects on glass fibers (see DE-A No. 2226932) are extruded into the PA by the process described above, the impact resistance is drastically reduced. Therefore, it has previously been impossible to color highly impact-resistant glass fiber-reinforced polyamides with essential dyes or pigments.

SUMMARY OF THE INVENTION

Surprisingly, it has now been found that, if the molding materials comprise a mixture of a glass fiber-containing PA, as component A, and an impact resistance-providing additive-containing PA, as component B, the impact resistance and notch toughness of the glass fiber-reinforced polyamide molding materials can be considerably increased, and the negative effects of various dyes and pigments can be overcome. The glass fibers and the impact resistance-providing additives are not added to the PA in a single operation, but separately.

DESCRIPTION OF THE INVENTION

Thermoplastic polyamides which can be used in the invention are preferably saturated, linear polyamides. Suitable polyamides are, e.g., polycaprolactam (PA 6), polyhexamethylene adipic acid amide (PA 6/6), polyhexamethylene sebacic acid amide, polyhexamethylene azelaic acid amide, polylaurolactam and polyundecanoamide; homo and copolyamides which are prepared by using adipic acid, azelaic acid, sebacic acid, dodecanedioic acid, tridecanedioic acid, terephthalic acid as one starting material and hexamethylenediamine, tetramethylenediamine, trimethylhexamethylenediamine, and bis (4-aminocyclohexyl)-methane or 2,2-bis(4'-aminocyclohexyl)propane as the other; and also copolyamides which are obtained by polycondensation of lactams together with the dicarboxylic acids and diamines given above.

The glass fibers used in the invention may be any conventional glass fibers generally suitable for the conventional reinforcement of polyamide molding materials. Glass fibers in the molding materials of the invention are usually from 0.05 to 1.0 mm, preferably 0.1 to 0.5 mm, long and normally have a diameter of 5 to 20 μm. preferably 6 to 14 μm.

Various commercial products can be introduced as the impact resistance providing additives. Preferably, ethylene-propylene copolymers and ethylene-butylene copolymers or styrene-butadiene-acrylic acid ester copolymers are used. All of these copolymers are maleic anhydride-terminated.

COMPARATIVE EMBODIMENTS

The following Examples 1 to 8 illustrate conventional procedures in which an impact-resistance modifier and a dye are extruded in the same extrusion channel together with the glass fibers.

EXAMPLES 1 to 8

In a two-wave extruder of the type ZSK 30 from Werner and Pfleiderer, Stuttgart, West Germany, PA 6 having a relative viscosity of 2.8 or PA 6/6 having a relative viscosity of 2.7 (measured as 1% by weight solution in 96% sulphuric acid) was melted at 220°–280° C. together with an impact-resistance modifier. The modifier is a maleic anhydride-terminated ethylene-propylene copolymer (Examples 1, 2, 3, 4, 7, 8) or a styrene-butadiene-acrylic acid ester copolymer (Examples 5, 6). Optionally, there is also present a dye or pigment which is Light Blue 100 (Examples 3, 4) or Fibaplast Green PA 261481 which contains $TiO_2$ (Examples 5, 6, 7, 8) according to the compositions given in Table 1. The glass fibers were introduced into this melt in the form of rovings, in the concentrations set forth in Table 1. All amounts are in weight percents. The cords thus extruded were cooled in a water bath, granulated and dried. The granulate was processed in an injection molding machine to give small beams in accordance with DIN 53,453. These bodies were dry tested in their newly-molded state. In order to test mechanical properties, the impact resistance and notch toughness at 23° C. according to DIN 53,453 were determined. The results are collated in Table 4.

TABLE 1

| Example | Modifier | PA 6 | PA 6/6 | Glass Fiber | Dye |
|---|---|---|---|---|---|
| 1 | 7 | 63.0 | — | 30 | — |
| 2 | 10.5 | 59.5 | — | 30 | — |
| 3 | 7 | 62.5 | — | 30 | 0.5 |
| 4 | 10.5 | 59.0 | — | 30 | 0.5 |
| 5 | 7 | 62.0 | — | 30 | 1.0 |
| 6 | 10.5 | 58.5 | — | 30 | 1.0 |
| 7 | 7 | — | 67 | 25 | 1.0 |
| 8 | 10.5 | — | 63.5 | 25 | 1.0 |

PREFERRED EMBODIMENTS

The following Examples 9 to 12 illustrate the invention, but are not to be construed as limiting.

Two formulations (I, II) were prepared by melting PA 6 and PA 6/6, respectively, as used in Examples 1 to 8, in the same extruder as in those Examples, at 220°–280° C. The glass fibers were introduced into the melt in the form of rovings in the concentrations given in Table 2. All amounts are in weight persents. The cords thus extruded were cooled in a water bath, granulated and dried.

TABLE 2

| FORMULATION | PA 6 | PA 6/6 | GLASS FIBER |
|---|---|---|---|
| I | 60 | — | 40 |
| II | — | 65 | 35 |

Four formulations (III, IV, V, VI) were prepared by melting PA 6 or PA 6/6, as in Examples 1 to 8, in the same extruder used in those Examples, at 220°–280° C., together with an impact-resistance modifier which is a maleic anhydride-terminated ethylene-propylene copolymer (III, V, VI) or a styrene-butadiene-acrylic acid ester copolymer (IV) and, optionally, with a dye or pigment which is Light Blue 100 (V) or Fibaplast Green PA 261481 (IV), in the concentrations given (in percentages by weight) in Table 3. The cords thus extruded were cooled in a water bath, granulated and dried.

TABLE 3

| FORMULATION | PA 6 | PA 6/6 | MODIFIER | DYE |
|---|---|---|---|---|
| III | 72 | — | 28 | — |
| IV | 68 | — | 28 | 4 |
| V | 78 | — | 18 | 4 |
| VI | — | 77.5 | 24.5 | — |

EXAMPLES 9 to 12

The respective compositions of Examples 1, 5, 3 and 7 were made, in the first three cases, by mixing 75% by weight of formulation I and 25% by weight of formulation III, IV or V, respectively. In the fourth case, 71.5% by weight of formulation II was mixed with 28.5% by weight of formulation VI. Each mixture was processed immediately in an injection molding machine to give small DIN beams in accordance with DIN 53,453. These test bodies were examined dry in their newly-molded state. As in Examples 1 to 8, impact-resistance and notch-toughness were measured at 23° C. according to DIN 53,453. The results are given in Table 4.

TABLE 4

| EXAMPLE | IMPACT RESISTANCE (kJ/m2) | NOTCH TOUGHNESS (kJ/m2) |
|---|---|---|
| 1 | 46.3 | 18 |
| 2 | 43.0 | 20.2 |
| 3 | 32.2 | 11.3 |
| 4 | 30.8 | 13.0 |
| 5 | 32.0 | 10.6 |
| 6 | 28.7 | 12.8 |
| 7 | 44.3 | 14.8 |
| 8 | 39.6 | 13.9 |
| 9 | 64.4 | 24.0 |
| 10 | 58.4 | 23.0 |
| 11 | 55.0 | 22.6 |
| 12 | 58.8 | 17.4 |

A comparison of the measured mechanical properties shows the advantages of products according to the invention. While the test bodies of Example 1 have reasonable impact resistance and notch toughness, the test bodies of Example 9 (the same composition) exhibit better values. While the colored test bodies of Example 5 show poor impact resistance and notch toughness, the test bodies of Example 10 (the same composition) exhibit values approximately twice as high.

What is claimed is:

1. A method of making a thermoplastic impact-resistant glass fiber-reinforced polyamide molding material, comprising mixing (A) a glass fiber-containing polyamide and (B) an impact-resistance-providing additive-containing polyamide.

2. A method according to claim 1, wherein components A and B contain thermoplastic polyamides selected from the group consisting of polyamides 6, 6/6, 12, 11, 6/9, 6/10, 6/12 and mixtures thereof.

3. A method according to claim 1, wherein both components A and B contain homo- and copolyamides which are prepared using (1) adipic acid, azelaic acid, sebacic acid, dodecanedioic acid, tridecanedioic acid or terephthalic acid and (2) hexamethylenediamine, tetramethylenediamine, trimethylhexamethylenediamine, bis (4-aminocyclohexyl) methane or 2,2-bis(4'-aminoecyclohexyl) propane, or copolyamides which are obtained by the polycondensation of lactams together with the dicarboxylic acids and diamines given above.

4. A method according to claim 1, wherein component A comprises 40–90% by weight polyamide and 10–60% by weight glass fibers.

5. A method according to claim 1, wherein component B comprises 30–95% by weight polyamide and 5–70% by weight of an impact-resistance-providing additive.

6. A method according to claim 1, wherein the mixing ratio of components A and B is 95:5 to 15:85 parts by weight.

7. A method according to claim 6, wherein the mixing ratio is from 80:20 to 20:80 parts by weight.

8. A method according to claim 1, wherein the additive is a maleic anhydride-terminated ethylene-propylene copolymer, an ethylene-butylene copolymer or a styrene-butadiene-acrylic acid ester copolymer.

9. A method of making a thermoplastic impact-resistant glass fiber-reinforced polyamide molding material, which comprises
  (i) formulating a polyamide containing glass fibers;
  (ii) separately formulating a polyamide containing an effective amount of an additive which imparts impact-resistance; and
  (iii) mixing the separate formulations.

10. A method according to claim 9, wherein both the formulations contain thermoplastic polyamides selected from the group consisting of polyamides 6, 6/6, 12, 11, 6/9, 6/10, 6/12 and mixtures thereof.

11. A method according to claim 9, wherein both the formulations contain homo- and copolyamides which are prepared using (1) adipic acid, azelaic acid, sebacic acid, dodecanedioic acid, tridecanedioic acid or terephthalic acid and (2) hexamethylenediamine, tetramethylenediamine, trimethylhexamethylenediamine, bis(4-aminocyclohexyl) methane or 2,2-bis(4'-amino cyclohexyl) propane, or copolyamides which are obtained by the polycondensation of lactams together with the dicarboxylic acids and diamines given above.

12. A method according to claim 9, wherein formulation (i) comprises 40–90% by weight polyamide and 10–60% by weight glass fibers.

13. A method according to claim 9, wherein formulation (ii) comprises 30–95% by weight polyamide and 5–70% by weight of an impact-resistance-providing additive.

14. A method according to claim 9, wherein the mixing ratio of the formulations is 95:5 to 15:85 parts by weight.

15. A method according to claim 14, wherein the mixing ratio is from 80:20 to 20:80 parts by weight.

16. A method according to claim 9, wherein the additive is a maleic anhydride-terminated ethylene-propylene copolymer, an ethylene-butylene copolymer or a styrene-butadiene-acrylic acid ester copolymer.

17. A method according to claim 4 wherein component A comprises heat and light-stabilizers.

18. A method according to claim 5 wherein component B comprises heat- and light-stabilizers, processing agents, dyes and pigments.

19. A method according to claim 12 wherein formulation (i) comprises heat- and light-stabilizers.

20. A method according to claim 13 wherein formulation (ii) comprises heat- and light-stabilizers, processing agents, dyes and pigments.

* * * * *